106. COMPOSITIONS, COATING OR PLASTIC.

84

Cross Reference

Examiner sodium silicate
$H_2SO_4$
Clay

Heat after treatment
Moisture " "

Nov. 16, 1937.　　　J. D. CARTER　　　2,099,598
FIBERBOARD
Filed March 27, 1935

Inventor
John D. Carter
By Norris & Bateman
Attorneys

Patented Nov. 16, 1937

2,099,598

UNITED STATES PATENT OFFICE 2,099,598

FIBERBOARD

John D. Carter, Lansdowne, Pa., assignor to Philadelphia Quartz Company, Philadelphia, Pa., a corporation of Pennsylvania Application March 27, 1935, Serial No. 13,335

2 Claims. (Cl. 154—40)

The present invention relates to adhesives and methods of making them, and it is more particularly concerned with improved methods for making and applying alkali silicate adhesives, and with methods of rendering adhesive or like films or layers containing silicate of soda, resistant to water.

In U. S. Patent No. 1,129,320, granted February 23, 1915 to James G. Vail and the present applicant, a method is described by which silicate of soda solutions may be caused to become resistant to water on drying.

In practicing that method, part of the sodium silicate is decomposed by an acid, while the concentration is so controlled that a gel does not form. In drying, it is believed that the silicic acid, set free from its combination with sodium oxide, becomes an irreversible colloid, that is, it becomes a more or less hydrous solid which will not return to its condition of dispersion in water when exposed to the action of that liquid.

If the amount of sodium silicate remaining undecomposed in the mixture just described, is comparatively small, good resistance to water may be attained on drying. With larger proportions of undecomposed silicate of soda present in the mixture I have found that the resistance to water is not so good. I have found that satisfactory resistance may be attained when the undecomposed silicate of soda is sufficient to form a film or coating on some solid body but this proportion of undecomposed silicate is not enough to enable the mixture to act satisfactorily as an adhesive in some applications.

In such applications, as in making combined fiberboard, wallboard, corrugated stock for containers, etc., the properties of the adhesive must be carefully controlled. It must be of such a texture that it will spread smoothly and evenly upon the surfaces of paper or card-board; it must penetrate sufficiently to secure a good grip on the fibers of the paper, yet not so much as to impoverish the adhesive layer; it must remain moist long enough to take hold on a ply, or plies, other than that on which it has been spread, yet, within a very short time thereafter, it must "set" or develop sufficient adhesive strength to resist the separating influence of trimming wheels or other parts of the machinery; it must be stronger, when dry, than the board on which it has been applied, and it must have a working life of at least several hours.

It is accordingly a primary object of this invention to improve and to also add to the prior art adhesives the property of resistance to water, without interfering with any of the characteristics just recited.

It is another important object of my invention to devise novel laminated fiberboard constructions having an adhesive for securing their component parts together which is highly resistant to water.

It is a further object of this invention to provide novel processes for manufacturing laminated fiberboard constructions.

It is another object of my invention to provide novel fiberboard constructions.

Further objects of my invention will become apparent as the specification proceeds, and in connection with the annexed drawing, and from the appended claims.

In the drawing:

Figure 1 is a fragmental sectional view of a pair of boards, one of which has had a coating of adhesive applied thereto;

Figure 2 is a view similar to Figure 1, but illustrates the boards secured together;

Figure 3 is a view similar to Figure 1, but illustrates a three-ply board structure and also shows the adhesive as being applied to both of the neighboring surfaces of the boards;

Figure 4 is a view of the parts of a corrugated board construction prior to assembly;

Figure 5 is a view of the construction of Figure 4 with the parts in assembled position; and Figure 6 is a sectional view of a corrugated board construction of modified form.

With continued reference to the drawing, wherein like reference characters have been employed to designate like parts throughout the several views, and with particular reference to Figure 1, I have illustrated a pair of boards 1 and 2 which may be constructed of any desired material, such as fiberboard, or the like. A layer or coating of adhesive 3 is spread upon board 1 in any suitable manner, such as by brushing, spraying or the like or in any other manner known in the art.

The boards are then placed together, as shown in Figure 2, and this operation likewise may be carried out in any suitable manner, such as by pressing between plates or passing the assembled boards between rolls.

In Figure 3 I have illustrated a composite board construction as it appears prior to assembly, and which comprises three boards 5, 6 and 7. In this instance I have shown the boards as having both of their neighboring surfaces provided with an adhesive coating 8, in order to build up a thicker film between the boards. This board construction may be assembled in the manner described in connection with the board construction shown in Figure 1.

In Figure 4, a pair of flat boards 9 and 10, having a corrugated board 11 disposed between them are shown. Prior to assembly, corrugated board 11 is coated at 12 with the adhesive, so that when the board is finished it assumes the form illustrated in Figure 5.

The board shown in Figure 6 is similar to that shown in Figures 4 and 5, with the exception that the central corrugated member 11 is left uncoated and the adhesive 13 is applied to the neighboring surfaces of boards 9 and 10. If desired however the adhesive may also be applied to member 11.

The board, in all of the above described forms, may be of any desired construction and be used for any desired purpose. For instance it may be employed for wallboard, paper stock for manufacturing paper cartons or the like. The adhesive may also be utilized to secure paper cartons or the like together after fabrication thereof. The board also may be made in more than three plies if desired.

All of the above described board constructions, when secured together with my adhesive, and subjected to a curing process after fabrication or assembly of the component parts of the board, are highly resistant to water or humid atmospheres.

To achieve this end, I make use of some of the broad principles noted above as being found in U. S. Patent No. 1,129,320 and also some of the teachings of U. S. Patent No. 1,188,040 granted June 20, 1916 to the present applicant. A simple combination of the teachings of these patents, however, has not yielded a satisfactory result. A further step is required to secure good resistance to water within a commercially feasible or a reasonably short time. I have discovered that to achieve this highly desirable result it is necessary as a further step: (1) to store the structure containing the properly compounded adhesive in a damp condition for a few hours or (2) to apply heat, or (3) combine the two treatments.

Before describing my method in detail, the broad aspects of the waterproofing treatment of the adhesive will be briefly set forth.

The conditions under which resistance to water has been found to develop are about as follows:

(1) At room temperature, storage of the adhesive-treated structure in a damp atmosphere for 6 hours is enough to develop fair resistance, when tested either in the damp condition or when allowed to dry before the test is made.

There has not been any indication that the resistance to water declines even on long continued storage under damp conditions. This has been tested for times up to 43 days.

(2) Heating the freshly fabricated structure to 100° C. for 3 minutes, heating to 80° C. for 1 minute, followed by 30 minutes at 60° C.; or heating at 60° C. for 45 minutes, all develop fair resistance to water.

In the past, various attempts have been made to attain resistance to water, in adhesives containing silicate of soda, by adding finely divided solid material which might react with the silicate to form insoluble compounds. In this way, discrete particles might be formed, which if sufficiently numerous might impart to the mass more or less capacity to resist water. Insofar, however, as these particles were enveloped in a soluble material, forming a continuous phase about them, resistance to water was not achieved.

The method herein described, is to be distinguished from those just mentioned, by the fact that it aims to render insoluble the continuous phase, rather than the discrete particles embedded therein.

As an illustration of my method, I may proceed as follows:

8 parts of silicate of soda, (of ratio about $1Na_2O$ to $3.22SiO_2$, and 41° Bé.)—are diluted with 112 parts of water. Sulphuric acid, preferably somewhat diluted, is then stirred in until the liquid just reacts acid to litmus paper: 104 parts of finely ground hydrous clay are then mixed in, followed by 187 parts of silicate of soda (preferably same as above). After thorough stirring, more clay may be added to give the adhesive the degree of stiffness which may be desired. (The amount of clay can not be specified exactly, because of the differences in behaviour of the several clays.)

The adhesive, so compounded, is applied to the boards shown in Figures 1 to 6 in the manner previously described. The adhesive may also be used in any other suitable manner, for combining plies of card-board, corrugated board, or the like. As soon as the adhesive has been applied and has set sufficiently (a minute or two is usually enough) the combined structure is treated in any one of four ways to develop resistance to water, as follows:

1. It may be allowed to dry at room temperature and then heated to about 90° C. for a half hour.

2. It may be heated to about 100° C. for 3 minutes without preliminary drying, or to lower temperatures for longer periods, e. g. to 60° C. for 45 minutes, or to 80° C. for 1 minute and then to 60° C. for 15 minutes, or 40° C. for two hours.

3. It may be kept damp for a few hours or indefinitely. Resistance to water has been found to be very good when the combined board has been kept damp continuously for 43 days.

4. After being kept damp for 6 hours it may be allowed to dry at room temperature, or after being subjected to any of the heat treatments above described, without preliminary drying.

The heat treatments above described may be carried out in any suitable manner, such as storing the finished board in ovens or by passing them successively between heated rolls. The damp treating process may be carried out by lightly spraying the finished articles with water or by storing them in a humidified room.

If desired the heat treatment may be combined with the damp treatment. For instance, if the finished boards are subjected to a heat treatment while they are stored in a damp place the curing period will be materially reduced, and the higher the temperature, within the limits above set forth, the more rapid will be the curing process.

As an example of a combined heat and moisture treatment, adhesive treated boards were heated over, but out of contact with a body of water, and the following results attained:

At 80° C. fair resistance developed in 10 minutes and good resistance in 15 minutes;

At 60° C., treatment for 30 minutes gave fair resistance and in 45 minutes good resistance developed.

Although I have set forth a specific example of the preferred form of my invention, it is to be understood that any other sodium or alkali silicate may be used to carry out the invention which manifests the property of becoming resistant to water upon being subjected to the treatments above described. Moreover a suitable filler other than clay may be mixed with the adhesive, for instance talc, powdered quartz or carbon may be used, and in certain applications of my adhesive the filler may be omitted entirely, and the appended claims are intended to embrace my invention when it assumes this form. Also, acids other than sulfuric acid may be employed to neutralize the silicate if desired. Moreover, the acid may be replaced by acid salts or other materials capable of combining with the alkali of the silicate if desired providing it effects the proper physical change therein to bring about water resistance.

Having thus described my invention, what I claim and desire to secure by U. S. Letters Patent is:

1. In the preparation of a composite fiber structure, the plies of which are united by an adhesive containing a partly neutralized alkali-metal silicate, the step of rendering the adhesive practically insoluble by keeping it in a humid atmosphere at a temperature of at least 60° C. for a period of at least 45 minutes.

2. A fiberboard comprising a plurality of plies attached one to another by means of an adhesive, which, in the finished board is highly insoluble in water, and contains a partially neutralized sodium silicate, the board having been kept in a humid atmosphere at a temperature of at least 60° C. for a period of at least 45 minutes.

JOHN D. CARTER.